United States Patent Office 3,535,112
Patented Oct. 20, 1970

3,535,112
TRANSPARENCIES FOR ELECTROSTATIC COPYING CONSISTING OF POLYESTER SHEETS COATED WITH A POLYAMIDE
Thomas J. Dolce, Menlo Park, and Donald L. McCabe, Rahway, N.J., assignors to Celanese Corporation, New York, N.Y., a corporation of Delaware
No Drawing. Filed July 17, 1967, Ser. No. 653,676
Int. Cl. G03g 13/14
U.S. Cl. 96—1.4     8 Claims

ABSTRACT OF THE DISCLOSURE

Transparencies are produced by forming an adherent image upon the modified surface of a transparent polyester sheet by transfer electrostatic copying. The transparent polyester sheet utilized in the invention possesses modified surface characteristics to improve adhesion which result from the presence of a polyamide resin coating thereon.

BACKGROUND OF INVENTION

The invention relates to the production of transparencies which may be utilized in visual education presentations wherein images are commonly projected with magnification onto a screen for the simultaneous viewing by a plurality of observers. More particularly, the invention relates to an improved method for efficiently producing a transparency by forming an adherent image upon a polyester sheet.

It has been known for many years that the projection with magnification of an image present upon a transparency may serve as an effective means for conveying information to one or more observers. In some instances such a projection has been accompanied by a spoken or recorded narration or explanation. The production of suitable transparencies or slides of a permanent character suitable for use in such a presentation has, however, heretofore commonly required the skill of a trained technician and the substantial expenditure of time and money. For example, transparencies have heretofore commonly been formed by the photographic reproduction of the desired image. Such a photographic reproduction procedure has required the controlled exposure, development, washing, and fixation of a light sensitive compound present on a support with or without the intermediate production of a negative image. Other techniques utilized in the past for the production of transparencies include silk screening, and diazo processes. In order for a transparency to give satisfactory service particularly upon repeated use it is essential that the image formed upon the transparent support tightly adhere to same, and not be removed by handling or other contact commonly encountered during use.

It is an object of the invention to provide an efficient and economical process for the production of transparencies.

It is an object of the invention to provide a transparency of a permanent nature which is capable of withstanding repeated use.

It is another object of the invention to provide a process for the production of a transparency utilizing a transparent polyester sheet upon which an adherent image of a permanent character is formed.

It is a further object of the invention to provide a process for production of transparencies which eliminates the need for the skill of a trained technician to produce the same.

These and other objects, as well as the scope, nature, and utilization of the invention will be apparent from the following detailed description and appended claims.

SUMMARY OF INVENTION

It has now been discovered that a process for the efficient production of transparencies comprises forming an adherent image upon the modified surface of a transparent polyester sheet by transfer electrostatic copying, said polyester sheet having at least one surface modified to improve adhesion by the presence of a coating thereon of a polyamide resin obtained by the condensation of a polymerized polyene fatty acid with an aliphatic polyamine.

DESCRIPTION OF PREFERRED EMBODIMENTS

Suitable polyester sheet or film materials which may be used in the present invention are formed from condensation products of a bifunctional dicarboxylic acid and a dihydric alcohol and possess dimensional stability at elevated temperatures. The preferred condensation products are formed with aromatic dicarboxylic acids; however, products formed with dicarboxylic acids such as adipic, sebacic, etc. are likewise acceptable. For instance, such polyesters may be of the type described in Carothers U.S. Pat. No. 2,071,250. The polyesters may be composed of any of the high-melting difficulty soluble, usually microcrystalline, cold-drawing, linear, highly polymerized esters of terephthalic acid and glycols of the series HO $(CH_2)_n$OH, where $n$ is an integer within the range of 2 to 10, described in Whinfield et al. U.S. Pat. No. 2,465,319. The particularly preferred polyester is polyethylene terephthalate.

Moreover, the polyesters used in accordance with the present invention need not consist solely of dicarboxylic acid and simple glycol units since some of the glycol units may react to form polyglycols, and small percentages of such polyglycol units may also be present. For instance, when ethylene glycol is a reactant, the polyester may contain from 1 to 15 percent by weight of diethylene glycol units, i.e. —$CH_2CH_2OCH_2CH_2O$—.

Preferably, the polyester which is utilized in the process is a heat stable highly polymeric linear polyethylene terephthalate sheet which has been biaxially oriented and heat set to provide improved dimensional stability, such as described in Alles U.S. Pat. No. 2,779,684. Orientation and heat setting may be conducted either before or after the polyamide resin coating described in detail hereafter is applied. It is preferred, however, that the coating be applied after the polyester sheet has undergone such treatment. A suitable thickness for the uncoated film ranges from about 0.0005 inch to about 0.014 inch. A thickness of about 0.004 inch is particularly preferred.

Attempts to form an adherent image upon the unmodified surface of a polyester sheet by transfer electrostatic copying have resulted in failure. The image formed fails to tenaciously adhere to the sheet and is totally or partially displaced upon contact, thus either completely destroying the image or producing an excessive smudge which renders the transparency unsuitable for further use.

The surface of the polyester sheet utilized in the present invention has been previously modified to improve adhesion by the presence of a polyamide resin coating thereon. The polyamide resin coating may suitably be formed by the condensation of a polymerized polyene fatty acid with an aliphatic polyamine. Such polyamide resins are well known to those skilled in the coating art and have been available commercially in the United States since about 1947. The fatty acid component of the polyamide resin contains two or more ethylenic groups and may be derived from vegetable oils such as soya bean oil, cottonseed oil, corn oil, perilla oil, linseed oil, tung oil, and the like. Such vegetable oils, which are commonly identified as drying oils, contain substantial quantities of high molecular weight unsaturated fatty acids which are particularly suited for use in the formation of the polyamide resins. Illustrative examples of common high molecular weight polyene fatty acids containing two or three ethylenic groups include linoleic acid (9,12-octadecadienoic acid), linolenic acid (9,12,15 - octadecatrienoic acid), and alpha- and beta-eleostearic acid. As is known in the art, the polyene fatty acids may be polymerized by the application of heat to provide a polymerized addition product which is largely dimerized or trimerized. Dimerized linoleic acid is the particularly preferred polymerized polyene fatty acid for use in the formation of the polyamide coating materials, and possesses a formula of

where R is a hydrocarbon group containing 34 carbon atoms.

The aliphatic polyamine which is condensed with the polymerized polyene fatty acid may have a $H_2N$—$R'$—$NH_2$ formula where $R'$ is an aliphatic hydrocarbon group, preferably containing from 1 to about 8 carbon atoms. For instance, suitable primary diamines include methylene diamine, ethylene diamine, propylene diamine, tetramethylene diamine, pentamethylene diamine, hexamethylene diamine, and octamethylene diamine. In a paritcuarly preferred polyamide coating resin ethylene diamine serves as the polyamine which is condensed with the polymerized polyene fatty acid. Aliphatic polyamines containing three or more primary or secondary amine groups may also be utilized.

The polyamide coating resins are thermoplastic materials, and may be formed according to the teachings of U.S. Pat. Nos. 2,379,413 and 2,450,940. Such polyamide resins commonly possess a molecular weight ranging from about 1,000 to about 10,000. In a particularly preferred embodiment of the invention the molecular weight of the polyamide resin ranges from about 6,000 to about 9,000. The physical configuration of suitable polyamide resins at room temperature may range from hard solids, through soft waxy solids. The polyamide coating resins are capable of forming a flexible adhesion improving coating or film upon the polyester sheet which is relatively inert and capable of undergoing only limited chemical reaction. Suitable polyamide coating resins are available commercially under the trade designation of Versamid polyamide resins from the General Mills Co., and include Versamid 900, 930, 940, and 950 polyamide resins.

The polyamide coating may be applied to the polyester sheet in liquid form from either the hot melt or from a solution of the same, and allowed to solidify. Suitable solvents for the polyamide resin include alcohols, such as n-propyl alcohol, isopropyl alcohol, and n-butyl alcohol; Cellosolve; and 1:1 mixtures of an alcohol and an aliphatic hydrocarbon such as naphtha or an aromatic hydrocarbon such as toluene or xylene. The polyamide coating may be imparted to at least one of the surfaces of the polyester sheet by conventional coating techniques which are well known in the coating art. For instance, the polyester may be simply passed through a hopper containing the polyamide in liquid form which is provided with a doctor blade, or the coating may be applied by use of a more precise coating apparatus such as a gravure press. When the coating is applied from a solvent the sheet may be passed through a forced air circulating oven maintained at about 150° C. to promote the efficient evaporation of the solvent and deposition of an adhesion promoting film upon the polyester sheet. Preferably an adhesion promoting coating of at least about 0.00005 inch thickness is produced upon the polyester sheet upon evaporation of the solvent or solidification of the melted polymer. In a particularly preferred embodiment of the invention a coating of about 0.0002 to about 0.0003 inch thickness is imparted to the polyester sheet. Since the polyamide resin coating is in the nature of an extremely thin film, only slight impairment of the transparency of the polyester sheet results from its presence, and transparencies formed therefrom by transfer electrostatic copying possess the requisite degree of transparency to be entirely satisfactory for most uses.

The transfer electrostatic copying technique which is used to form an adherent image upon the polyester sheet according to the present invention has become extensively utilized in the office copying field in recent years and is well known. Many offices of even modest size and/or resources have readily available the necessary equipment for efficient electrostaitc copying. Such equipment which has heretofore been utilized largely to copy various documents with the image being formed upon paper may according to the present invention also be utilized to efficiently produce transparencies of excellent quality. Office personnel such as secretaries who are familiar with the operation of electrostatic copiers can form transparencies using the instant process without the need for technical training.

As is well known, transfer electrostatic copying commonly involves imparting a uniform positive electrostatic charge to a photoconducting surface which will hold a charge only in the dark, such as a selenium coated drum. This may be accomplished by passing the drum under a series of corona-discharge wires in the dark. The photoconducting surface is then exposed through a lens system to a document or article bearing the image which is to be formed. In areas where light strikes the photoconducting surface the charge is dissipated and flows off through a conducting support to ground, with the positive electrostatic charge remaining largely intact in the image areas. Next negatively charged toner powder comprising a pigmented thermoplastic resin is cascaded across the photoconducting surface, and clings by electrostatic attraction to the positively charged areas of the surface. A sheet which is to receive the image is placed over the powder image, and is given a positive charge, such as by use of corona-discharge wires. As a result, a large portion of the negative charged powder on the photoconducting surface is transferred to the sheet. Finally, the sheet is heated to melt the thermoplastic powder and bond the same to the sheet.

When it is desired to make multiple transparencies according to the present invention at a high rate of speed, the surface of each polyester sheet opposite the surface which receives the image may be covered with a transparent resinous slip coating so that the coefficient of friction between the surfaces present in a stack of the polyester sheets is lowered to insure single feeding of the same within a high speed electrostatic copier. Alternating sheets of paper or tissue with uncoated surface modified polyester sheets may also be used to insure proper feeding of the sheets into an electrostatic copier while making high speed multiple transparencies.

The following example is given as a specific illustration of the invention. It should be understood, however, that the invention is not limited to the specific details set forth in the example.

EXAMPLE

A transparent biaxially oriented and heat set surface modified sheet (8½ x 11 inches) of polyethylene terephthalate possessing a melting point of about 265° C., and a thickness of 0.004 inch was placed in a Xerox 914 electrostatic copier. The selenium-coated drum of the copier was given a uniform positive electrostatic charge. The drum was exposed to a document bearing an intricate hand-drawn graph. Conventional thermoplastic toner powder possessing a negative charge was contacted with the surface of the drum. Next the sheet of surface modified polyethylene terephthalate was placed over the drum and given a positive electrostatic charge so that the image present upon the drum was transferred to the polyester sheet. The sheet was heated to 200° C. and the thermoplastic toner powder permanently adhered to the same to produce a transparency.

The modified surface characteristics of the polyethylene terephthalate sheet utilized in the production of the transparency were produced by coating the surface of the biaxially oriented and heat set sheet with a 10 percent by weight solution of isopropyl alcohol of a linear polyamide resin obtained by the condensation of approximately equimolar quantities of dimerized linoleic acid with ethylene diamine. The polyamide resin utilized was a commercially available solid resin of a wax-like consistency designated as Versamid 950 polyamide resin. The polyamide resin possessed an amine number (mg. KOH equivalent to 1 gram of resin) of 4; a Gardner color value of 10; a softening point (ASTM E28–51T) of 95° C.; and a viscosity of 5.5 poises measured at 160° C. with a Brookfield viscometer, Model RVF.

The application of the polyamide solution was accomplished by contacting the polyethylene terephthalate sheet with a hard rubber roller which was supplied with the solution, and a uniform coating of the desired thickness was achieved by use of a conventional No. 4 Mayer bar. Upon placement of the sheet for two minutes in a forced air circulating oven maintained at 150° C. the isopropyl alcohol solvent was volatilized, and a uniform adhesion improving coating of 0.0002 to 0.0003 inch thickness was imparted to the sheet which did not appreciably impair the transparency or color thereof.

Next a sheet of oriented and heat set transparent polyethylene terephthalate identical to that previously described with the exception that it lacked any surface modification was run through the same electrostatic copier under the same conditions as described above.

The adherency of the images present on the sheets was tested by rubbing the same vigorously with the finger. The image fixation of the transparency formed according to the present invention was good, i.e., none of the image was removed and only slight smudging resulted after repeated rubbing. The image fixation of the transparency formed upon the unmodified polyethylene terephthalate sheet was poor since the image was partially removed and smudged excessively under finger pressure.

The transparencies formed according to the present invention if desired may be mounted in frames of various sizes and used in conventional visual education projectors or for the preparation of tracings. It is also possible for a series of images to be formed adjacent each other on a roll of surface modified polyester sheet and the resulting transparency roll viewed by use of an overhead projector, or the like.

Although the invention has been described with preferred embodiments, it will be understood that variations and modifications may be resorted to as will be apparent to those skilled in the art. Such variations and modifications are to be considered within the purview and scope of the claims appended hereto.

We claim:
1. In a method for producing a transparency comprising forming an adherent image upon a surface of a transparent polyester sheet by transfer electrostatic copying, the polyester comprising the condensation product of a bifunctional aromatic dicarboxylic acid and a dihydric alcohol, the improvement which comprises modifying at least one surface of said polyester sheet to improve adhesion by the presence of a coating thereon of a polyamide resin obtained by the condensation of a polymerized polyene fatty acid with an aliphatic polyamine.

2. A method according to claim 1 wherein said polyester sheet is an oriented and heat set highly polymeric linear polyethylene terephthalate.

3. A method according to claim 1 wherein said polyester sheet has a coating thereon of a polyamide resin obtained by the condensation of dimerized linoleic acid with an aliphatic polyamine.

4. A method according to claim 1 wherein said polyester sheet has a coating thereon of a polyamide resin obtained by the condensation of a polymerized polyene fatty acid with an aliphatic polyamine possessing a formula of $H_2N—R'—NH_2$ where $R'$ is an aliphatic hydrocarbon group containing 1 to about 8 carbon atoms.

5. A method according to claim 1 wherein said polyester sheet has a coating thereon of a polyamide resin obtained by the condensation of approximately equimolar quantities of dimerized linoleic acid with ethylene diamine.

6. In a method for producing a transparency comprising forming an adherent image upon a modified surface of a transparent oriented and heat set highly polymeric linear polyethylene terephthalate sheet by transfer electrostatic copying, the improvement which comprises modifying at least one surface of said polyethylene terephthalate sheet to improve adhesion by the presence of a coating thereon of a polyamide resin obtained by the condensation of approximately equimolar quantities of dimerized linoleic acid with ethylene diamine.

7. A transparency prepared by forming an adherent image upon a surface of a transparent polyester sheet by transfer electrostatic copying, wherein said polyester is a condensation product of a bifunctional dicarboxylic acid and a dihydric alcohol, said polyester sheet having at least one surface modified to improve adhesion by the presence of a coating thereon of a polyamide resin obtained by the condensation of a polyene fatty acid with an aliphatic polyamine.

8. A transparency according to claim 7 wherein said transparent polyester sheet is an oriented and heat set highly polymeric linear polyethylene terephthalate.

References Cited
UNITED STATES PATENTS

| | | | |
|---|---|---|---|
| 2,450,940 | 10/1948 | Cowan et al. | 260—404.5 |
| 2,484,416 | 10/1949 | Martin | 117—68.5 |
| 3,275,436 | 9/1966 | Mayer | 96—1.4 X |

GEORGE F. LESMES, Primary Examiner

M. B. WITTENBERG, Assistant Examiner

U.S. Cl. X.R.

96—1; 117—72, 211